US011847483B2

(12) United States Patent
Kowalczyk et al.

(10) Patent No.: US 11,847,483 B2
(45) Date of Patent: Dec. 19, 2023

(54) SECURE VIRTUAL MACHINE SOFTWARE MANAGEMENT

(71) Applicant: International Business Machines Corporation, Armonk, NY (US)

(72) Inventors: Szymon Kowalczyk, Cracow (PL); Andrzej Pietrzak, Cracow (PL); Michal Paluch, Cracow (PL); Tomasz Hanusiak, Cracow (PL); Piotr P. Godowski, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 351 days.

(21) Appl. No.: 17/110,391

(22) Filed: Dec. 3, 2020

(65) Prior Publication Data

US 2022/0179673 A1    Jun. 9, 2022

(51) Int. Cl.
*G06F 9/455* (2018.01)
*G06F 21/64* (2013.01)
*G06F 9/48* (2006.01)
*G06F 21/62* (2013.01)
*G06F 21/60* (2013.01)

(52) U.S. Cl.
CPC ........ *G06F 9/45558* (2013.01); *G06F 9/4881* (2013.01); *G06F 21/602* (2013.01); *G06F 21/6254* (2013.01); *G06F 21/64* (2013.01); *G06F 2009/45587* (2013.01)

(58) Field of Classification Search
CPC .. G06F 9/45558; G06F 9/4881; G06F 21/602; G06F 21/6254; G06F 21/64; G06F 2009/45587; G06F 21/121; G06F 21/53
See application file for complete search history.

(56) References Cited

U.S. PATENT DOCUMENTS

| 10,437,622 | B1  | 10/2019 | Chalmer |
| 10,628,612 | B2  | 4/2020  | Durham  |
| 11,341,217 | B1* | 5/2022  | Corral .................. H03M 13/09 |

(Continued)

OTHER PUBLICATIONS

Li et al., "Protecting Cloud Virtual Machines from Hypervisor and Host Operating System Exploits", This paper is included in the Proceedings of the 28th USENIX Security Symposium, Aug. 14-16, 2019, 19 pages.

*Primary Examiner* — Bruce S Ashley
(74) *Attorney, Agent, or Firm* — Randy Tejeda

(57) ABSTRACT

One or more computer processors responsive to a hypervisor data request, generate an encrypted set of hypervisor data indicating hypervisor hardware details using a plurality of respective asymmetric encryption keys to tag the generated set of encrypted hypervisor data with a timestamp at a time of encryption. The one or more computer processors decrypt the tagged set of encrypted hypervisor data utilizing a software asset manager and the plurality of respective asymmetric encryption keys determined valid based on a threshold time period and the tagged timestamp. The one or more computer processors validate the set of decrypted hypervisor data utilizing corresponding checksums to determine whether the set of encrypted hypervisor data was successfully decrypted. The one or more computer processors sanitize the validated hypervisor data based on a corresponding software license.

20 Claims, 3 Drawing Sheets

(56) References Cited

U.S. PATENT DOCUMENTS

| | | | |
|---|---|---|---|
| 2008/0126788 A1* | 5/2008 | Kreek | G06F 9/4411 |
| | | | 713/100 |
| 2011/0145590 A1* | 6/2011 | Harada | H04L 67/568 |
| | | | 713/185 |
| 2014/0281469 A1* | 9/2014 | Ali | G06F 9/45558 |
| | | | 713/2 |
| 2016/0147550 A1* | 5/2016 | McWilliams | G06F 9/45558 |
| | | | 718/1 |
| 2017/0046230 A1* | 2/2017 | Guzik | H04L 67/1097 |
| 2017/0171197 A1 | 6/2017 | Alexander | |
| 2017/0244557 A1 | 8/2017 | Riel | |
| 2018/0060397 A1* | 3/2018 | Byard | G06Q 10/087 |

* cited by examiner

SECURE VIRTUAL MACHINE SOFTWARE MANAGEMENT

BACKGROUND

The present invention relates generally to the field of software management, and more particularly to secure virtual machine software management.

A hypervisor is computer software, firmware, or hardware that creates and runs virtual machines. A computer on which a hypervisor runs one or more virtual machines is called a host machine, and each virtual machine is called a guest machine. A virtual machine is an efficient, isolated duplicate of a real computer machine. Virtual machines may have no direct correspondence to any real hardware. The hypervisor presents the guest operating systems with a virtual operating platform and manages the execution of the guest operating systems. Multiple instances of a variety of operating systems may share the virtualized hardware resources contrasting with operating-system-level virtualization, where all instances (i.e., containers) must share a single kernel, though the guest operating systems can differ in user space.

SUMMARY

Embodiments of the present invention disclose a computer-implemented method, a computer program product, and a system. The computer-implemented method includes one or more computer processers responsive to a hypervisor data request, generating an encrypted set of hypervisor data indicating hypervisor hardware details using a plurality of respective asymmetric encryption keys to tag the generated set of encrypted hypervisor data with a timestamp at a time of encryption. The one or more computer processors decrypt the tagged set of encrypted hypervisor data utilizing a software asset manager and the plurality of respective asymmetric encryption keys determined valid based on a threshold time period and the tagged timestamp. The one or more computer processors validate the set of decrypted hypervisor data utilizing corresponding checksums to determine whether the set of encrypted hypervisor data was successfully decrypted. The one or more computer processors sanitize the validated hypervisor data based on a corresponding software license.

DETAILED DESCRIPTION

Figure 1:
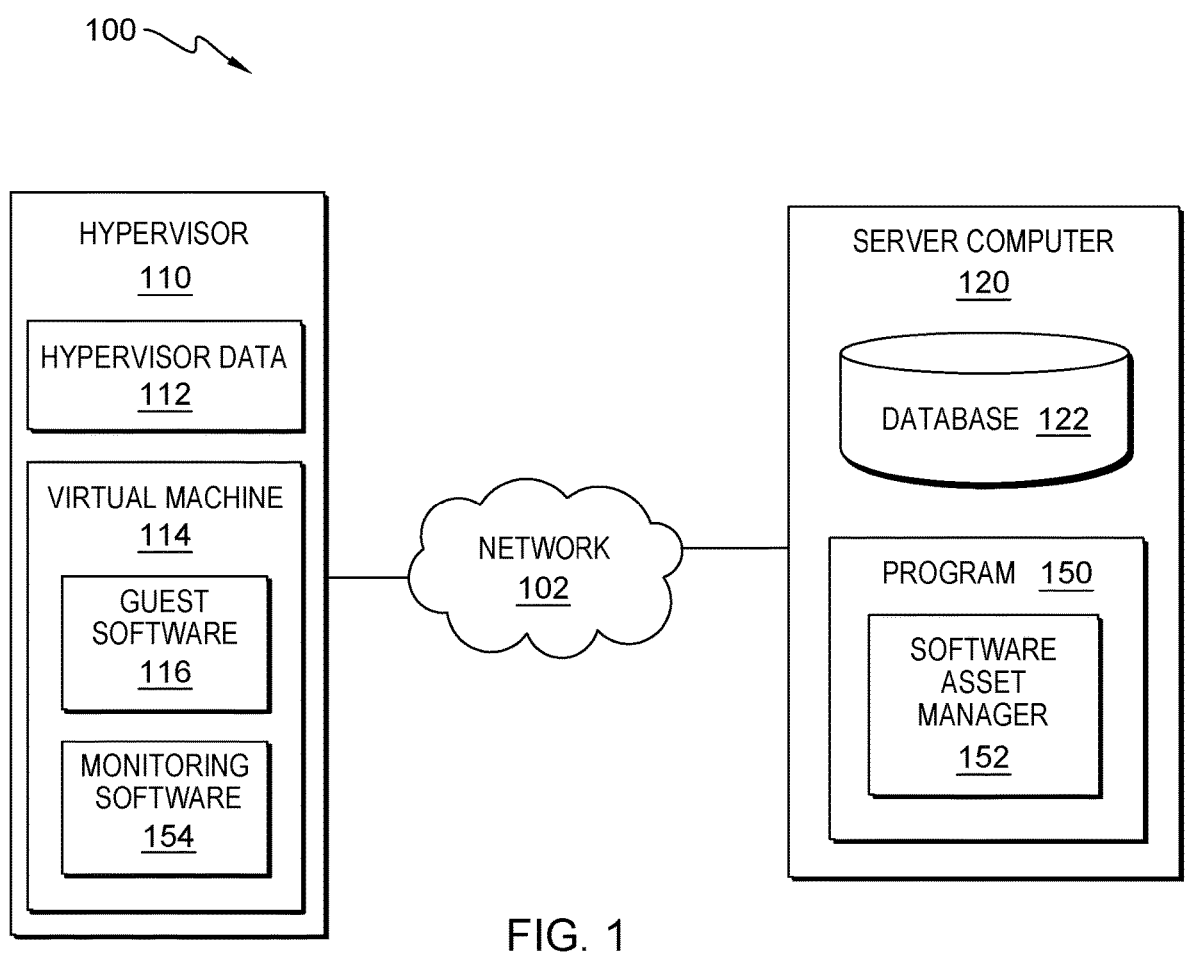
FIG. 1 (i.e., FIG.) is a functional block diagram illustrating a distributed data processing environment, in accordance with an embodiment of the present invention.

Traditional software license management requires access to bare metal hardware and associated system specifications to calculate accurate software usage and mitigate corresponding license restrictions. Typically, applications require direct access to bare metal hardware (e.g., number of cores, central processing unit (CPU) model, etc.) to properly calculate software usage. As modern information technology continues to utilize virtual machines, virtual appliances, and containers to host software, effective software usage/license management has deteriorated. Frequently when licensed applications run on a virtual machine, licensing functions can only detect virtualized hardware that may not directly correspond to bare metal hardware due to security constraints and virtual machine isolation principles. Virtualized hardware can be significantly different than the bare metal hardware utilized by the hypervisor. This issue is exacerbated when instances of application are concurrently running on a shared hypervisor, where the sum of the virtual hardware consumed by hosted virtual machine is greater than the bare metal hardware (i.e., resource over-commitment, CPU simultaneous multithreading, etc.). In addition, on-the-fly virtual machine migration to other hypervisors hosted on various systems negatively impacts effective software license management. Current methods for software license management in a virtualized environment gather data from a virtual machine regarding license usage and combine usage data with hypervisor data utilizing an application programming interface (API). Unfortunately said methods require a constant connection to track the hypervisor relation to the virtual machine. This constant connection often involves hypervisors that comprise critical systems which presents an additional attack vector on said systems. In addition, when said constant connection is unavailable, usage tracking becomes unreliable and inaccurate.

Embodiments of the present invention recognize that software management and licensing in virtualized environment is improved through secure dissemination of hypervisor hardware details to an isolated guest virtual machine. Embodiments of the present invention recognize that hypervisor security is improved through the secure dissemination of hypervisor hardware details to an isolated virtual machine utilizing a maintained asymmetrically encrypted channel. Embodiments of the present invention implement the asymmetrically encrypted channel through a dedicated interface to a virtual machine basic input/output system (BIOS) that provides access to encrypted data regarding hypervisor hardware and virtual machine settings for license monitoring software hosted on a virtual machine. Embodiments of the present invention utilize encryption to secure and isolate hypervisor data from guest systems. Embodiments of the present invention gather data from the guest system in the same time frame as a hypervisor hardware scan, providing real-time hardware analysis for software usage purposes. Embodiments of the present invention calculate software usage of one or more licensed applications utilizing generated encrypted hypervisor data from a set of hypervisors. Embodiments of the present invention dynamically adjust a plurality of hypervisors, virtual machines, and associated applications based on calculated software usage. Implementation of embodiments of the invention may take a variety of forms, and exemplary implementation details are discussed subsequently with reference to the Figures.

The present invention will now be described in detail with reference to the Figures.

FIG. 1 is a functional block diagram illustrating a distributed data processing environment, generally designated 100, in accordance with one embodiment of the present invention. The term "distributed" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes hypervisor 110, server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between hypervisor 110, server computer 120, and other computing devices (not shown) within distributed data processing environment 100. In various embodiments, network 102 operates locally via wired, wireless, or optical connections and can be any combination of connections and protocols (e.g., personal area network (PAN), near field communication (NFC), laser, infrared, ultrasonic, etc.).

Hypervisor 110 may be any electronic device or computing system capable of processing program instructions and receiving and sending data. In some embodiments, hypervisor 110 may be a laptop computer, a tablet computer, a netbook computer, a personal computer (PC), a desktop computer, a personal digital assistant (PDA), a smart phone, or any programmable electronic device capable of communicating with network 102. In other embodiments, hypervisor 110 may represent a server computing system utilizing multiple computers as a server system, such as in a cloud computing environment. In general, hypervisor 110 is representative of any electronic device or combination of electronic devices capable of executing machine readable program instructions as described in greater detail with regard to FIG. 3, in accordance with embodiments of the present invention. Hypervisor 110 may provide a virtual BIOS for the virtual machine (i.e., guest machine or system) where such BIOS mimics all virtual systems calls for hardware information (e.g., bare metal hardware and/or virtualized hardware). In an embodiment, the virtual BIOS provides a method to gather encrypted data by software running on virtual machine 114. In an embodiment, the virtual BIOS provides dynamic adjustment based on subsequent software usage calculations. Here, a virtual machine may have dedicated virtual hardware reserved for virtual computational requirements. Hypervisor 110 contains hypervisor data 112, virtual machine 114 which further contains guest software 116, and monitoring software 154.

Hypervisor data 112 comprises a plurality of descriptive information regarding hypervisor 110. In an embodiment, hypervisor data 112 includes hypervisor identifiers, hypervisor hostname, hypervisor internet protocol (IP), hypervisor bare metal hardware specifications, date and time information, virtual machine parameters and configuration details, virtual machine identifiers, and data checksums.

Virtual machine 114 provides a complete system platform and supports the execution of a complete operating system (OS). Virtual Machine 114 emulates an existing architecture, and provides a platform to run guest software 116, for example, on virtualized hardware where the real hardware is not available for use, such as executing on obsolete platforms.

Guest software 116 is a set of one or more virtualized programs, applications, and software designed to carry out one or more computational operations for a specific task. In an embodiment, guest software 116 is subject to one or more licenses controlling software usage.

Monitoring software 154 is a client program of program 150, residing on hypervisor 110 and/or virtual machine 114, providing an asymmetrically encrypted hypervisor data 112 and virtual machine settings for monitoring software 154. In an embodiment, monitoring software 154 monitors guest software 116, hosted on virtual machine 114, for license compliance. Monitoring software 154 collects information regarding installed and running guest software 116. In an embodiment, monitoring software 154 gathers data required for guest software 116 detection and usage tracking alongside with encrypted hypervisor data 112. In a further embodiment, monitoring software 154 collects and encrypts hypervisor data 112, responsively transmitting encrypted hypervisor data 112 to software asset manager 152.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with hypervisor 110 and other computing devices (not shown) within distributed data processing environment 100 via network 102. In another embodiment, server computer 120 represents a computing system utilizing clustered computers and components (e.g., database server computers, application server computers, etc.) that act as a single pool of seamless resources when accessed within distributed data processing environment 100. In the depicted embodiment, server computer 120 includes database 122 and program 150. In other embodiments, server computer 120 may contain other applications, databases, programs, etc. which have not been depicted in distributed data processing environment 100. Server computer 120 may include internal and external hardware components, as depicted and described in further detail with respect to FIG. 3.

Database 122 is a repository for data used by program 150. In the depicted embodiment, database 122 resides on server computer 120. In another embodiment, database 122 may reside on hypervisor 110 or elsewhere within distributed data processing environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as software licenses and controls, usage restrictions, hypervisor information, and virtual machine information.

Program 150 is a program for securely controlling and providing hypervisor information to virtualized applications. In various embodiments, program 150 may implement the following steps: generate an encrypted set of hypervisor data indicating hypervisor hardware details using a plurality of respective asymmetric encryption keys to tag the generated set of encrypted hypervisor data with a timestamp at a time of encryption; decrypt the tagged set of encrypted hypervisor data utilizing a software asset manager and the plurality of respective asymmetric encryption keys determined valid based on a threshold time period and the tagged timestamp; validate the set of decrypted hypervisor data utilizing corresponding checksums to determine whether the set of encrypted hypervisor data was successfully decrypted; and sanitize the validated hypervisor data based on a corresponding software license. Program 150 may be implemented in multiple ways. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on hypervisor 110 and/or any other computing device (not depicted) within distributed data processing environment 100. Program 150 contains software asset manager 152, a module for managing and optimizing the purchase, deployment, maintenance, utilization, and disposal of software, and monitoring software 154. In an embodiment, software asset manager 152 manages the redistribution of licenses associated with software ownership and expiration by tracking license usage and expiration. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
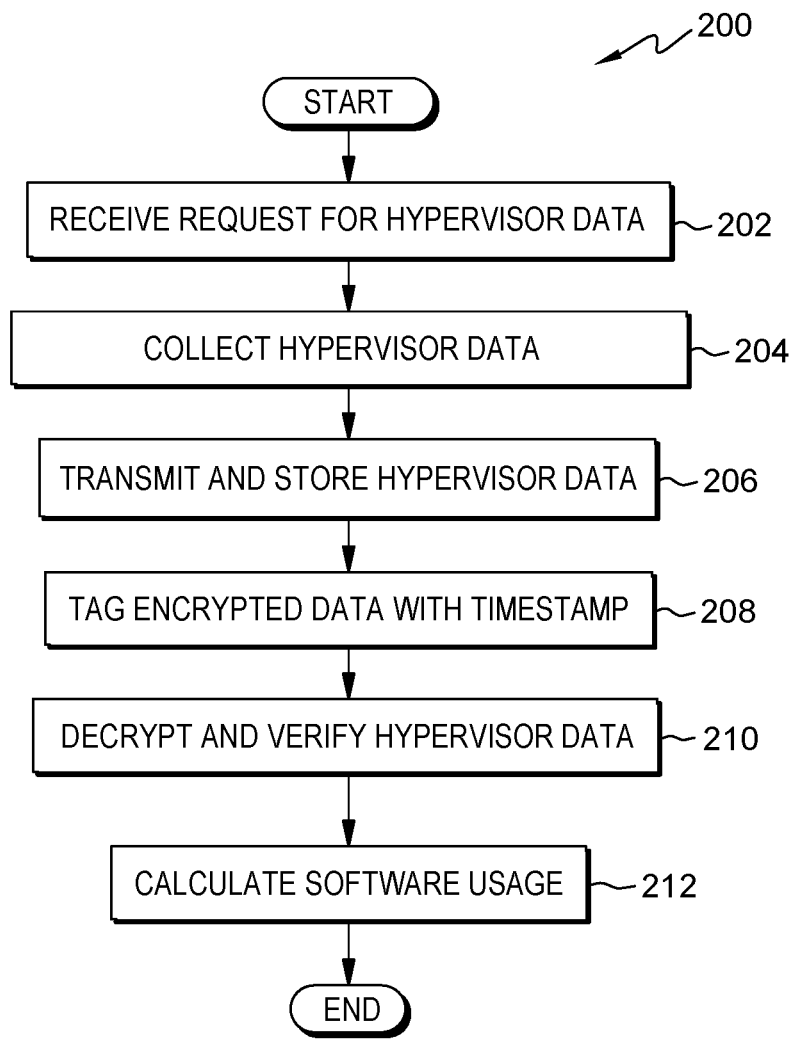
FIG. 2 is a flowchart depicting operational steps of a program, on a server computer within the data processing environment of FIG. 1, for securely controlling and providing hypervisor information to virtualized applications, in accordance with an embodiment of the present invention.

FIG. 2 depicts flowchart 200 illustrating operational steps of program 150 for securely controlling and providing hypervisor information to virtualized applications, in accordance with an embodiment of the present invention.

Program 150 receives a request for hypervisor data (step 202). In an embodiment, program 150 initiates subject to a user request or a request for hypervisor data 112 from one or more virtualized applications or programs contained in a set of hypervisors. In another embodiment, program 150 commences responsive to a detected installation of licensed software onto a virtual machine and/or a monitored hypervisor 110. In another embodiment, program 150 initiates responsive to an application activation request. In yet another embodiment, program 150 initiates responsive to an organizational software audit. In an embodiment, program 150 identifies the requesting application and retrieves any relevant licensing information such as usage restrictions (e.g., concurrent running applications, geographical restrictions, CPU restrictions, etc.). In another embodiment, program 150 intercepts any activation request or any license transmission to and from guest software 116. In an embodiment, program 150 transmits the request for hypervisor data 112 to monitoring software 154.

Program 150 collects hypervisor data (step 204). Program 150 instructs monitoring software 154 to collect and generate hypervisor data 112 indicating hypervisor hardware details associated with hypervisor 110 administering one or more virtual machines that each comprise one or more requesting applications, where hypervisor data includes hypervisor identifiers, hypervisor hostname, hypervisor IP identification, hypervisor bare metal hardware, date and time information, virtual machine parameters and configuration details, virtual machine identifiers, and data checksums. In an embodiment, program 150 instructs monitoring software 154 to poll hypervisor 110 for additional encrypted hypervisor data 112 including, but not limited to, CPU configurations (i.e., number of CPU cores, number of threads per CPU core, non-uniform memory access (NUMA) nodes, remote memory access latency, memory bandwidth, CPU-GPU link bandwidth/latency, and CPU-CPU interconnection bandwidth/latency) and graphical processing unit (GPU) configurations (i.e., number of GPUs, GPU compute capability (FLOPS), available GPU memory, GPU topology, GPU-GPU link bandwidth, and GPU-GPU link latency). For example, responsive to a request from program 150, hypervisor 110 responds with device identification information. In another embodiment, program 150 identifies hypervisor 110 utilizing a unique identifier, manufacturer part number, and/or part number. In another embodiment, monitoring software 154 provides a virtual system management BIOS (SMBIOS) as a data specification for the hypervisor data generated above. In this embodiment, a client version of program 150 (i.e., monitoring software 154) is maintained in conjunction with hypervisor 110.

Program 150 transmits and stores hypervisor data (step 206). In an embodiment, for each hypervisor in a set of hypervisors, monitoring software 154 provides one or more private key and public key pairs utilizing the virtual SMBIOS detailed in step 204. In this embodiment, monitoring software 154 creates a set of encrypted hypervisor data 112 with associated encryption keys. In an embodiment, monitoring software 154 utilizes asymmetric cryptography (e.g., asymmetric encryption keys) to generate a private key and public key utilized to encrypt and decrypt subsequent hypervisor data communications. In a further embodiment, monitoring software 154 generates a plurality of public keys and private keys. In this embodiment, monitoring software 154 utilizes a set of generated keys in a round-robin fashion responsive to a hypervisor data 112 request. Monitoring software 154 utilizes asymmetric cryptography to securely encrypt hypervisor data 112 for each hypervisor in the set of hypervisors and provide isolation from component virtual machines. In an embodiment, monitoring software 154 transmits the generated hypervisor data 112 to a controlled software asset manager (i.e., software asset manager 152). In this embodiment, monitoring software 154 also transfers an associated public key along with metadata associated with generated hypervisor data 112 such as creation/encryption timestamps, validity (e.g., expiration) date, data permissions, etc.

Program 150 tags the encrypted hypervisor data with a timestamp (step 208). In an embodiment, program 150 tags encrypted hypervisor data 112 with a plurality of timestamps associated with the creation, encryption, and transmission of the encrypted hypervisor data. In another embodiment, program 150 tags hypervisor data 112 with a calculated checksum for subsequent data verification. The tagged hypervisor data 112 is then stored in the software asset manager.

Program 150 decrypts and verifies the hypervisor data (step 210). In an embodiment, program 150 utilizes one or more encryption keys provided by a user or hypervisor 110 to decrypt the encrypted hypervisor data. In a further embodiment, program 150 utilizes a received public key to verify the authenticity of the transmitting hypervisor. In another embodiment, program 150 verifies permissions and licensing files associated with the transmitting hypervisor. In another embodiment, program 150 verifies the hypervisor data 112 utilizes associated data checksums to determine that the encrypted hypervisor data was successfully decrypted. In a further embodiment, program 150 utilizes the tagged timestamps to verify that the encrypted hypervisor data is still within an acceptable range (i.e., threshold time period).

Program 150 calculates software usage (step 212). In an embodiment, for each successfully decrypted hypervisor data 112, program 150 calculates software usage containing software utilization details such as hardware specifications associated with virtual machine 114, guest software 116 utilization count, and guest software 116 utilization duration. In this embodiment, program 150 calculates software usage by comparing decrypted hypervisor data 112 to one or more parameters (e.g., restrictions, limitations, payment tiers, etc.) contained in associated software licenses. For example, the parameters contained in associated software licenses contain limitations regarding CPU type or number of cores, here, program 150 utilizes the decrypted hypervisor data 112 to identify license compliance or identify any non-conforming usage, such as noncompliant hypervisor specifications. In a further embodiment, program 150 assembles hypervisor data 112 from all running guest software 116, subject to a licensing requirement, comparing respective decrypted hypervisor data 112 to parameters in a controlling license. For example, in a situation where a software license restricts concurrent users to 50 users, program 150 compiles a plurality of generated hypervisor data 112 from all active application instances and compares said information to the software license parameters. In a further embodiment, program 150 sanitizes hypervisor data 112 and/or calculated software usage by removing irrelevant information and information not needed to satisfy a corresponding software license. For example, if a license requirement only restricts usage count, then program 150 removes all information not related to usage count. In another example, if a license requirement restricts CPU cores but not CPU type or model, then program 150 removes all identifying CPU information while retaining information about the cores. In an embodiment, program 150 encrypts the calculated software usage, containing compliance instructions and details, with the public key associated to hypervisor 110 and transmits the results to monitoring software 154 and in turn to guest software 116. In an embodiment, program 150 dynamically adjusts hypervisor 110, virtual machine 114, and/or running guest software 116 to conform to one or more licensing requirements based on the calculated software usage. For example, in a situation where guest software 116 is restricted to four CPU cores, program 150 alters the hypervisor to limit virtual machine 114 to four CPU cores or restricts guest software 116 to four CPU cores.

Figure 3:
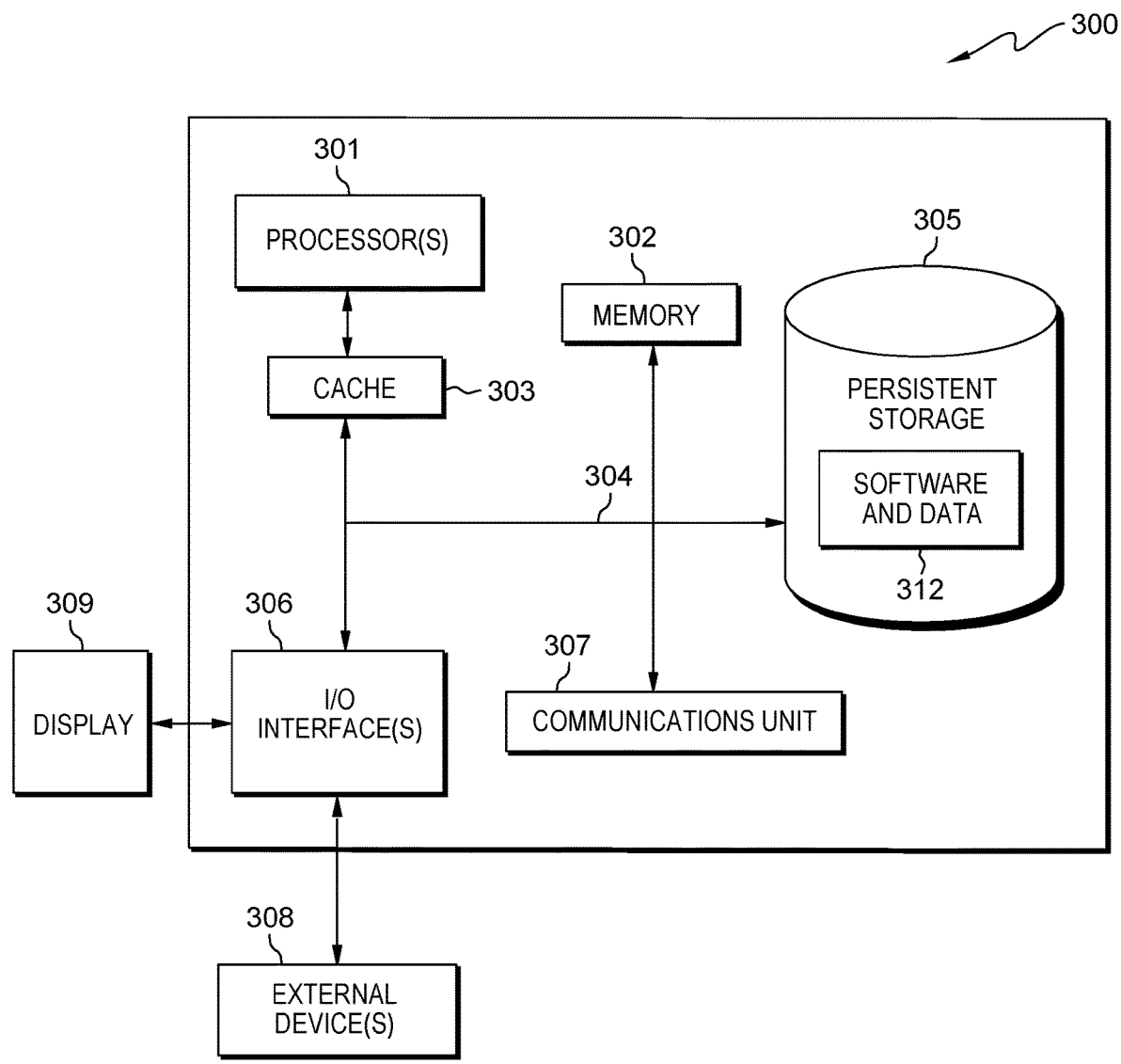
FIG. 3 is a block diagram of components of hypervisor and server computer, in accordance with an embodiment of the present invention.

FIG. 3 depicts block diagram 300 illustrating components of hypervisor 110 and server computer 120 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Hypervisor 110 and server computer 120 includes communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 312 can be stored in persistent storage 305 for access and/or execution by one or more of the respective processors 301 via cache 303.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected, respectively, to hypervisor 110 and server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    responsive to a hypervisor data request, generating, by one or more computer processors, an encrypted set of hypervisor data indicating hypervisor hardware details using a plurality of respective asymmetric encryption keys, wherein hardware data includes a checksum;
    tagging, by one or more computer processors, the generated set of encrypted hypervisor data with a timestamp at a time of encryption;
    decrypting, by one or more computer processors, the tagged set of encrypted hypervisor data utilizing a software asset manager and the plurality of respective asymmetric encryption keys determined valid based on a threshold time period and the tagged timestamp;
    validating, by one or more computer processors, the set of decrypted hypervisor data utilizing corresponding checksums to determine whether the set of encrypted hypervisor data was successfully decrypted; and
    sanitizing, by one or more computer processors, the validated set of decrypted hypervisor data based on a corresponding software license, wherein sanitizing the validated set of decrypted hypervisor data removes information in the validated set of decrypted hypervisor data that is unrelated to the corresponding software license.

2. The computer-implemented method of claim 1, further comprising:
    calculating, by one or more computer processors, a software usage of a respective hypervisor utilizing the sanitized set of decrypted hypervisor data.

3. The computer-implemented method of claim 2, further comprising:
    dynamically adjusting, by one or more computer processors, a hypervisor associated with the sanitized set of decrypted hypervisor data utilizing the calculated software usage.

4. The computer-implemented method of claim 1, wherein each set of hypervisor data further includes a hypervisor identification, a hypervisor hostname, a hypervisor internet protocol (IP) identification, a date, a time, a virtual machine configuration, and a virtual machine identification.

5. The computer-implemented method of claim 1, wherein decrypting the tagged set of encrypted hypervisor data is completed in a round-robin fashion.

6. The computer-implemented method of claim 1, further comprising:
    communicating, by one or more computer processors, the set of encrypted hypervisor data through a system management basic input/output system.

7. The computer-implemented method of claim 1, wherein the set of encrypted hypervisor data is stored on the software asset manager.

8. A computer program product comprising:
    one or more computer readable storage media and program instructions stored on the one or more computer readable storage media, the stored program instructions comprising:
    program instructions to responsive to a hypervisor data request, generate an encrypted set of hypervisor data indicating hypervisor hardware details using a plurality of respective asymmetric encryption keys, wherein hardware data includes a checksum;
    program instructions to tag the generated set of encrypted hypervisor data with a timestamp at a time of encryption;
    program instructions to decrypt the tagged set of encrypted hypervisor data utilizing a software asset manager and the plurality of respective asymmetric encryption keys determined valid based on a threshold time period and the tagged timestamp;
    program instructions to validate the set of decrypted hypervisor data utilizing corresponding checksums to determine whether the set of encrypted hypervisor data was successfully decrypted; and
    program instructions to sanitize the validated set of decrypted hypervisor data based on a corresponding software license, wherein the program instructions to sanitize the validated hypervisor data removes information in the validated hypervisor data that is unrelated to the corresponding software license.

9. The computer program product of claim 8, wherein the program instructions, stored on the one or more computer readable storage media, further comprise:
    program instructions to calculate a software usage of a respective hypervisor utilizing the sanitized set of decrypted hypervisor data.

10. The computer program product of claim 9, wherein the program instructions, stored on the one or more computer readable storage media, further comprise:
    program instructions to dynamically adjust a hypervisor associated with the sanitized set of decrypted hypervisor data utilizing the calculated software usage.

11. The computer program product of claim 8, wherein each set of hypervisor data further includes a hypervisor identification, a hypervisor hostname, a hypervisor internet protocol (IP) identification, a date, a time, a virtual machine configuration, and a virtual machine identification.

12. The computer program product of claim 8, wherein decrypting the tagged set of encrypted hypervisor data is completed in a round-robin fashion.

13. The computer program product of claim 8, wherein the program instructions, stored on the one or more computer readable storage media, further comprise:

program instructions to communicate the set of encrypted hypervisor data through a system management basic input/output system.

14. The computer program product of claim 8, wherein the set of encrypted hypervisor data is stored on the software asset manager.

15. A computer system comprising:
one or more computer processors;
one or more computer readable storage media; and
program instructions stored on the computer readable storage media for execution by at least one of the one or more processors, the stored program instructions comprising:
program instructions to responsive to a hypervisor data request, generate an encrypted set of hypervisor data indicating hypervisor hardware details using a plurality of respective asymmetric encryption keys, wherein hardware data includes a checksum;
program instructions to tag the generated set of encrypted hypervisor data with a timestamp at a time of encryption;
program instructions to decrypt the tagged set of encrypted hypervisor data utilizing a software asset manager and the plurality of respective asymmetric encryption keys determined valid based on a threshold time period and the tagged timestamp;
program instructions to validate the set of decrypted hypervisor data utilizing corresponding checksums to determine whether the set of encrypted hypervisor data was successfully decrypted; and
program instructions to sanitize the validated set of decrypted hypervisor data based on a corresponding software license, wherein the program instructions to sanitize the validated hypervisor data removes information in the validated hypervisor data that is unrelated to the corresponding software license.

16. The computer system of claim 15, wherein the program instructions, stored on the one or more computer readable storage media, further comprise:
program instructions to calculate a software usage of a respective hypervisor utilizing the sanitized set of decrypted hypervisor data.

17. The computer system of claim 16, wherein the program instructions, stored on the one or more computer readable storage media, further comprise:
program instructions to dynamically adjust a hypervisor associated with the sanitized set of decrypted hypervisor data utilizing the calculated software usage.

18. The computer system of claim 15, wherein each set of hypervisor data further includes a hypervisor identification, a hypervisor hostname, a hypervisor internet protocol (IP) identification, a date, a time, a virtual machine configuration, and a virtual machine identification.

19. The computer system of claim 15, wherein decrypting the tagged set of encrypted hypervisor data is completed in a round-robin fashion.

20. The computer system of claim 15, wherein the set of encrypted hypervisor data is stored on the software asset manager.

* * * * *